(12) United States Patent
Wahlström (10) Patent No.: US 11,933,210 B2
(45) Date of Patent: Mar. 19, 2024

(54) EXHAUST AFTERTREATMENT UNIT FOR CLEANING EXHAUST GASES (71) Applicant: VOLVO TRUCK CORPORATION, Gothenburg (SE)

(72) Inventor: Gert-Ove Wahlström, Askim (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 17/807,525

(22) Filed: Jun. 17, 2022

(65) Prior Publication Data
US 2023/0003153 A1    Jan. 5, 2023

(30) Foreign Application Priority Data

Jul. 1, 2021 (EP) ..................................... 21183103

(51) Int. Cl.
| | |
|---|---|
| *F01N 3/20* | (2006.01) |
| *B01D 46/00* | (2022.01) |
| *B01D 46/42* | (2006.01) |
| *B01D 53/94* | (2006.01) |
| *F01N 3/035* | (2006.01) |

(Continued)

(52) U.S. Cl.
CPC ....... *F01N 3/2026* (2013.01); *B01D 46/0002* (2013.01); *B01D 46/4263* (2013.01); *B01D 53/9431* (2013.01); *B01D 53/944* (2013.01); *F01N 3/035* (2013.01); *F01N 3/106* (2013.01); *F01N 3/2066* (2013.01); *F01N 13/0093* (2014.06); *B01D 2279/30* (2013.01); *F01N 2610/02* (2013.01); *F01N 2610/1453* (2013.01)

(58) Field of Classification Search
None
See application file for complete search history.

(56) References Cited

U.S. PATENT DOCUMENTS 3,768,982 A * 10/1973 Kitzner .................... B01J 35/02
                                                          422/174
7,550,024 B2    6/2009 Pawson et al.
(Continued)

FOREIGN PATENT DOCUMENTS

| EP | 1484481 A1 * | 12/2004 | ............. F01N 13/14 |
|----|----|----|----|
| EP | 1484481 A1 | 12/2004 | |

(Continued)

OTHER PUBLICATIONS

Extended European Search Report in corresponding European Application No. 21183103.7 dated Dec. 3, 2021 (7 pages).

*Primary Examiner* — Jelitza M Perez
(74) *Attorney, Agent, or Firm* — Venable LLP; Jeffri A. Kaminski (57) ABSTRACT

An exhaust aftertreatment unit for cleaning exhaust gases includes an emission reducing module being a diesel particulate filter, DPF, and/or a diesel oxidation catalyst, DOC, a selective catalyst reduction, SCR, catalyst, an electrical heating element arranged upstream of the emission reducing module, a casing housing at least the emission reducing module and the electrical heating element, and a service lid removably arranged to cover a service opening of the casing through which the emission reducing module may be accessed. The electrical heating element is removably arranged relative the casing and is arranged accessible upon removal of the service lid and the emission reducing module.

10 Claims, 6 Drawing Sheets

(51) Int. Cl.
    *F01N 3/10*     (2006.01)
    *F01N 13/00*   (2010.01)

(56) References Cited

U.S. PATENT DOCUMENTS

| | | |
|---|---|---|
| 9,221,016 B2 | 12/2015 | Van Niekerk et al. |
| 2011/0219755 A1 | 9/2011 | Muller-Haas |
| 2014/0154139 A1* | 6/2014 | Van Niekerk ......... F01N 13/017 422/174 |
| 2014/0360162 A1* | 12/2014 | Gonze ................... F01N 3/2013 60/274 |
| 2015/0040525 A1* | 2/2015 | Werni ................... F01N 3/0211 55/495 |
| 2019/0111388 A1* | 4/2019 | Yokoyama ............. B01D 53/94 |
| 2020/0217234 A1* | 7/2020 | Huang ................... F01N 3/025 |
| 2020/0300141 A1 | 9/2020 | Gaiser |
| 2021/0404362 A1* | 12/2021 | Salemme ............... F02M 26/15 |

FOREIGN PATENT DOCUMENTS

| | | |
|---|---|---|
| EP | 3757361 A1 | 12/2020 |
| WO | 2014008930 A1 | 1/2014 |

\* cited by examiner

EXHAUST AFTERTREATMENT UNIT FOR CLEANING EXHAUST GASES

TECHNICAL FIELD

The present invention relates to an exhaust aftertreatment unit for cleaning exhaust gases. The invention further relates to a method for handling an exhaust aftertreatment unit for a vehicle, to an electrical heating element for use in exhaust aftertreatment unit, and to a vehicle comprising an exhaust aftertreatment unit.

BACKGROUND

A vehicle typically comprises an engine for propelling the vehicle. The engine may be powered by various means, such as e.g. by liquid or gaseous fuel in an internal combustion engine, or by electric power in an electric machine. Moreover, hybrid solutions exist in which the vehicle is propelled both by an internal combustion engine and an electric machine.

In case the engine is a combustion engine, such as a diesel engine, it is common to provide the vehicle with an exhaust aftertreatment system, EATS, to handle emissions from the engine. An EATS for a diesel engine typically includes a diesel oxidation catalyst, DOC, a diesel particulate filter, DPF, and a selective catalytic reduction SCR catalyst. A reductant, such as urea or an ammonia comprising substance, is injected upstream of the SCR catalyst to assist in converting nitrogen oxides, also referred to as NOx, with the aid of a catalyst into diatomic nitrogen, N2, and water, and potentially carbon dioxide CO2 (depending on the choice of the reductant). The cleaned, or at least emission reduced, exhaust gases then leaves the EATS and the vehicle through the tailpipe of the vehicle. Other types of engines causing similar emissions as the diesel engine may utilize the same, or a similar, EATS.

Government regulations, together with a constant demand for increased fuel economy of the vehicle, implies a need for a more efficient operation of the EATS. For example, the EATS must heat up fast and have a high conversion efficiency also at very low loads when the temperature of the exhaust gases is low. The need of very efficient engines for meeting stringent CO2-requirements also leads to lower temperature of the exhaust gases and higher engine out NOx-levels which requires large amounts of reductant to be injected upstream the SCR catalyst. Furthermore, when using urea as the reductant, the urea requires heat to evaporate and hydrolyse into ammonia. If the temperature is low, there is a large risk for creating crystallization and deposits that reduce the effect of the EATS.

Electrical heating elements may be used to heat the exhaust gases to counteract the low temperature of the exhaust gases and reduce the associated disadvantages. However, the addition of electrical heating elements to the EATS increase the complexity of the system, and/or add components that risk being subject to failure and in need of maintenance or exchange. Failure of components in the EATS often requires time consuming servicing with costly downtime of the vehicle. Moreover, component failure which leads to component exchange, or even exchange of the complete EATS, is bad for the environment.

Thus, there is a need in the industry for an improved EATS aiming to alleviate the above-mentioned drawbacks.

SUMMARY

It is an object of the present invention to at least partly alleviate the shortcomings discussed above in relation to known exhaust aftertreatment system, and provide an improved exhaust aftertreatment unit.

According to a first aspect of the present invention, an exhaust aftertreatment unit for cleaning exhaust gases is provided. The exhaust aftertreatment unit comprises:
- an emission reducing module, being a diesel particulate filter, DPF, and/or a diesel oxidation catalyst, DOC, a selective catalyst reduction, SCR, catalyst,
- an electrical heating element arranged upstream of the emission reducing module,
- a casing housing at least the emission reducing module and the electrical heating element, and
- a service lid removably arranged to cover a service opening of the casing through which the emission reducing module may be accessed,
- wherein the electrical heating element is removably arranged relative the casing and is arranged accessible upon removal of the service lid and the emission reducing module.

Hereby, the electrical heating element is easily accessible in the exhaust aftertreatment unit and may be subject to maintenance or exchange. Thus, an exhaust aftertreatment unit which alleviates the shortcomings of low temperatures of the exhaust gases by means of the electrical heating element, but which has a simple configuration enabling easy access to the electrical heating element is provided. Thus, an improved exhaust aftertreatment unit is provided with a highly efficient removal of emission of the exhaust gases owing at least to the heating of the exhaust gases by the electrical heating element, while reducing the additional complexity of the electrical heating element as it is easily accessible upon removal of the service lid. Moreover, by arranging the electrical heating element upstream of the emission reducing module, the emission reducing module may be heated by the electrical heating element. Additionally or alternatively, any other component (such as e.g. a secondary catalyst as will be explained later in the text) arranged between the emission reducing module and the electrical heating element may be heated by the electrical heating element.

According to at least one example embodiment, the emission reducing module comprises a first end portion (or downstream end portion) having a first end surface (or downstream facing surface) facing downstream of the fluid pathway in the exhaust aftertreatment unit, and comprises an opposite second end portion (or upstream end portion) having a second end surface (or upstream facing surface) facing upstream of the fluid pathway, wherein the electrical heating element is arranged upstream of the second end portion. For example, the electrical heating element is facing the second end surface. According to at least one example embodiment, the service lid is arranged to face the first end portion and the first end surface. That is, when the emission reducing module is arranged inside the casing, the first end portion is arranged to face the service lid, and the second end portion is arranged upstream of the first end portion.

According to at least one example embodiment, the emission reducing module, i.e. the DPF and/or DOC, is removably arranged inside the casing and may be passed through the service opening upon removal of the service lid. It should be noted that the emission reducing module may comprise a stationary member being integrated and firmly attached to the casing, and an insert member which is removably arranged in the stationary member. For such embodiments, the insert member is removably arranged inside the casing and may be passed through the service opening upon removal of the service lid. Thus, throughout the present description, the emission reducing module may refer to the emission reducing module, or the insert member of the emission reducing module.

According to at least one example embodiment, the electrical heating element is arranged on an opposite side of the emission reducing module compared to the service lid. That is, the service lid and the electrical heating element is arranged on opposite sides of the emission reducing module. Such configuration may be advantageous, as the electrical heating element and any electrical connections used to power the electrical heating element is arranged distant from the service lid and the service opening used when e.g. removing the emission reducing module. That is, as the emission reducing module may be removably arranged relative the casing and arranged accessible upon removal of the service lid, the emission reducing module may be accessed and/or removed from the casing without interfering with the electrical heating element. For example, if only the emission reducing module is subject to maintenance or exchange, it can be accessed or removed from the casing independently of the electrical heating element.

According to at least one example embodiment, the electrical heating element is arranged inside the casing (e.g. during use of the exhaust aftertreatment unit), and may be removed relative the casing by being passed through the service opening, subsequent to removing the emission reducing module and the service lid (e.g. during maintenance of the exhaust aftertreatment unit). Hereby, the electrical heating element may be easily accessible via the service opening. For example, maintenance may be performed on the electrical heating element via the service opening or via the removed electrical heating element. Thus, and according to at least one example embodiment, the electrical heating element may be removed from the casing by being passed through the service opening for maintenance and/or for exchanging the component. The service lid may combine the function of being a service lid for both the electrical heating element and the emission reducing module.

The emission reducing module is a diesel particulate filter, DPF, i.e. being configured to remove particles, such as diesel particulate matter or soot, from the exhaust gases and/or a diesel oxidation catalyst, DOC arranged and configured to convert carbon monoxide and hydrocarbons into carbon dioxide. Thus, according to at least one example embodiment, the emission reducing module is a combined DPF/DOC, for example in which the DOC is arranged upstream of the DPF. According to at least one example embodiment, the emission reducing module is a DPF. According to at least one example embodiment, the emission reducing module is a DOC. In case the emission reducing module is a combined DPF/DOC, the DPF and DOC need not to be combined in the same unit, but the DPF and DOC may be comprised in separate units, wherein the separate units are separated by means of a gap. Thus, exhaust gases may enter the DOC, be subject to emission reduction in the DOC, and subsequently exit the DOC into the gap. Thereafter the exhaust gases enter the DPF from the gap, is subject to emission reduction in the DPF, and subsequently exit the DPF. The two separate units may according to one example embodiment be attached to each other, e.g. by a connecting element extending from the DPF to the DOC via the gap. However, according to at least one example embodiment, the DPF and the DOC of the combined DPF/DOC are comprised in the same unit.

According to at least one example embodiment, the casing comprises a mounting socket housing the emission reducing module and the electrical heating element.

Hereby, the emission reducing module and the electrical heating element may be satisfactorily arranged inside the casing. During use of the electrical heating element, the electrical heating element may be arranged and configured to keep the temperature in the mounting socket at between 180° C. and 300° C.

According to at least one example embodiment, the emission reducing module and the electrical heating element are removably arranged relative the mounting socket. That is, the electrical heating element may be removably arranged relative the casing by being removably arranged relative the mounting socket. Correspondingly, the emission reducing module may be removably arranged relative the casing by being removably arranged relative the mounting socket.

The mounting socket is preferably arranged inside the casing such that the service lid faces a mouth or orifice of the mounting socket. Thus, upon removal of the service lid, the emission reducing module may be removed from the casing and the mounting socket by being passed by the mouth or orifice of the mounting socket and subsequently passed through the service opening. That is, the service opening and the mouth or orifice of the mounting socket are preferably co-axial. Hereby, the electrical heating element may be accessed via the service opening through the mouth or orifice of the mounting socket. Subsequently, the electrical heating element may be removed from the casing and the mounting socket by being passed through the mouth or orifice of the mounting socket and subsequently passed through the service opening.

According to at least one example embodiment, the geometrical shape of the mounting socket is adapted to the geometrical shape of the emission reducing module. Hereby, the emission reducing module may be efficiently arranged inside the mounting socket. According to at least one example embodiment, the mounting socket is geometrically shaped as an open cylinder, or a tube. Correspondingly, the emission reducing module is preferably cylindrically shaped. The geometrical shape of the electrical heating element may according to at least one example embodiment be adapted to the geometrical shape of the mounting socket. For example, the electrical heating element may be geometrically shaped as a round, or circular, heating element, e.g. as a coil.

According to at least one example embodiment, the mounting socket is integrated and firmly attached to the casing. It should be noted that the mounting socket may be the stationary member of the emission reducing module previously described. Alternatively, the stationary member of the emission reducing module is integrated and firmly attached to the mounting socket of the casing.

According to at least one example embodiment, the electrical heating element is powered by at least one electrical connection extending from an external surface of the casing and into the mounting socket upstream of the electrical heating element.

Hereby, means for enabling that the emission reducing module may be accessed and/or removed from the casing without interfering with the electrical heating element is provided. The external surface of the casing through which the electrical connection extends may be referred to as an external surface portion of the casing, and is typically arranged on an opposite side of the casing as compared to the service lid. Thus, and according to at least one example embodiment, the service lid and the external surface of the casing through which the electrical connection extends through are arranged on opposite sides of the casing. By that the electrical connection extends from an external surface of the casing and into the mounting socket upstream of the electrical heating element, the electrical connection does not interfere with, or interact with, the service lid and/or service opening. Thus, an advantageous means for powering the electrical heating element is provided. Typically, the at least one electrical connection is extending at least through the external surface of the casing. That is, the at least one electrical connection is extending from an outside of the casing, from, and through, the external surface of the casing, and into the mounting socket upstream of the electrical heating element. Typically, the casing has a specific wall thickness, the wall thickness being defined as the distance from the external surface (or the external surface portion) of the casing to a corresponding internal surface (or internal surface portion) of the casing. The internal surface, or internal surface portion, typically faces the mounting socket and the electrical heating element arranged therein.

According to at least one example embodiment, the electrical connection is releasably mounted to the external surface of the casing.

According to at least one example embodiment, the at least one electrical connection comprises at least two electrical connection wires, a power wire (or phase wire) and a neutral wire, wherein current is configured to flow between the power wire and the neutral wire as the electrical heating element is powered.

According to at least one example embodiment, the exhaust aftertreatment unit further comprises at least one guide element for guiding the electrical connection through the external surface of the casing, wherein the electrical heating element and the at least one electrical connection are removably attached to the guide element, or that the electrical heating element, the at least one electrical connection and the guide element are removably attached to the external surface of the casing.

Hereby, at least two solutions for adequality providing the electrical connection from outside of the casing to the electrical heating element inside of the casing, while still enabling the electrical heating element to be removably arranged relative the casing, is provided.

According to at least one example embodiment, the electrical heating element and at least the electrical connection is removably arranged relative the casing by an attachment configuration arranged in the external surface of the casing. Hereby, the electrical heating element and at least the electrical connection may be detached from the casing by accessing the attachment configuration in the external surface of the casing. Thus, the method may comprise detaching the electrical heating element from the casing by the attachment configuration in the external surface of the casing.

According to at least one example embodiment, the electrical connection is gas tight. For example, the at least one guide element provides the gas tight functionality.

According to at least one example embodiment applicable to the electrical heating element and the at least one electrical connection being removably attached to the guide element, the guide element comprises at least one tube (or one tube for every electrical connection wire, e.g. two tubes) extending through the external surface of the casing. The at least one tube may be integrated and firmly attached to the external surface of the casing, e.g. by means of an end plate welded to the external surface. One end portion of the at least one tube may be threaded and provided with a screw-nut (thus providing said attachment configuration), possibly equipped with one or more internal cones that will interact with the electrical connection by compression (i.e. by so called "compression fitting"). When removing the electrical connection from the tube, the screw-nut is simply threaded of the tube to release the compression fitting.

According to at least one example embodiment, applicable to the electrical heating element, the at least one electrical connection and the guide element being removably attached to the external surface of the casing, the guide element comprises at least one flange, the flange typically being firmly attached to the electrical connection of the electrical heating element. The flange may comprise a plurality of threaded holes and may be releasably mounted in the external surface of the casing by means of screws threaded into the threaded holes (thus providing said attachment configuration). When removing the guide element (and the electrical connection and electrical heating element) from the external surface of the casing, the screws are simply threaded out of the threaded holes to release the guide element from the casing. Optionally a gasket may be used.

According to at least one example embodiment, the electrical heating element is removably arranged to the at least one electrical connection. Hereby, an alternative way of removing the electrical heating element relative to the casing is provided. For such embodiment, the electrical connection and any guide element are firmly attached to the casing, and the electrical heating element is removably arranged to the electrical connection by means of e.g. screws or other fastening means. Thus, the electrical heating element is typically detached from the electrical connection from inside the mounting socket. According to at least one example embodiment, the electrical connection is integrated into the external surface of the casing.

According to at least one example embodiment, the mounting socket extends along a longitudinal axis, wherein the at least one electrical connection extends inside the mounting socket in a direction along or parallel to the longitudinal axis.

Hereby, removal of the electrical heating element from the casing is facilitated, as the electrical connection extends in the same direction as the direction of the removing the electrical heating element. That is, the mounting socket extends along its longitudinal axis, and the electrical heating element is removed from the casing by passing the component in a direction along or parallel to the longitudinal axis. Thus, by that the electrical connection extends in the same direction as the direction which the electrical heating element is being removed from the casing, the removal of the electrical heating element from the casing is facilitated. For example, the risk of having the electrical connection interacting, and potentially getting stuck with, the internal surface of the mounting socket is reduced. Correspondingly, the emission reducing module is removed from the casing by passing the component in a direction along or parallel to the longitudinal axis. Referring to the first end portion and second end portion of the emission reducing module, the emission reducing module is configured for axial removal from the mounting socket with the first end portion leading the axial removal. Correspondingly, the emission reducing module is configured for axial insertion into the mounting socket with the second end portion leading the axial insertion.

According to at least one example embodiment, the electrical heating element is attached to the emission reducing module and is removably arranged relative the casing together with the emission reducing module.

Hereby, the electrical heating element may be removed relative the casing through the service opening upon the removal of the emission reducing module. That is, the electrical heating element may be attached to the DPF and/or DOC. For embodiments in which the emission reducing module is a combined DPF/DOC, the electrical heating element is typically attached to the DOC. For the embodiment in which the electrical heating element is attached to the emission reducing module, the electrical heating element is preferably attached to the second end portion of the emission reducing module.

According to at least one example embodiment, the emission reducing module and the electrical heating element are attached to the service lid and are removably arranged relative the casing together with the service lid. Hereby, the electrical heating element may be removed relative the casing through the service opening upon the removal of the service lid.

According to at least one example embodiment, the exhaust aftertreatment unit further comprises a secondary catalyst arranged between the emission reducing module and the electrical heating element.

Hereby, the electrical heating element may heat the secondary catalyst. Thus, the electrical heating element may be arranged upstream the emission reducing module and the secondary catalyst in order to improve the performance of the emission reducing module and/or the secondary catalyst. The secondary catalyst is preferably arranged in the mounting socket. According to at least one example embodiment, the secondary catalyst is removably arranged relative the casing, and may arranged to be removable through the service opening of the casing upon removal of the service lid, and typically upon removal of the emission reducing module. Hereby, the service lid may combine the function of being a service lid for both the electrical heating element, the emission reducing module and the secondary catalyst. According to at least one example embodiment, the secondary catalyst is a secondary SCR catalyst.

According to at least one example embodiment, the electrical heating element is used together with an upstream injection of hydrocarbon, e.g. fuel. That it, such upstream injection of hydrocarbons is performed upstream of the electrical heating element. This may further increase the heat release over the electrical heating element and/or the DOC.

According to at least one example embodiment, the service lid is removably arranged to the casing by a removable fastener, such as e.g. a clamp.

According to at least one example embodiment, the exhaust aftertreatment unit further comprises an injector configured to inject a reductant for providing ammonia to the SCR catalyst, wherein the injector is arranged upstream of the SCR catalyst and downstream of the emission reducing module.

Hereby, the electrical heating element may heat the exhaust gases passing the electrical heating element, and the emission reducing module, whereafter the heated exhaust gases will heat the injected reductant. Thus, the reductant may be hydrolysed into ammonia. Thus, the electrical heating element is arranged upstream of the injector. Thus, during use, the electrical heating element is heating the exhaust gases prior to that the exhaust gases encounter the position for the injected reductant, whereby the provided heat from the electrical heating element to the exhaust gases heats the injected reductant. Hereby, fouling caused by the injected reductant can be reduced or even omitted.

According to at least one example embodiment, in which the secondary catalyst is a secondary SCR catalyst, the exhaust aftertreatment unit further comprises a secondary injector configured to inject a reductant for providing ammonia to the secondary SCR catalyst, wherein the secondary injector is arranged upstream of the secondary SCR catalyst. Optionally, the secondary injector is arranged upstream of the exhaust aftertreatment unit.

According to at least one example embodiment, the reductant is at least one of the following: anhydrous ammonia, aqueous ammonia, urea, aqueous urea and a diesel exhaust fluid. According to at least one example embodiment, the reductant is urea or liquid urea, hereafter commonly referred to as urea. The electrical heating element may thus, via the heated exhaust gases, provide the urea with the required heat to evaporate and be hydrolysed into ammonia. Depending on the operating power of the electrical heating element, the heated exhaust gases may additionally heat up the SCR catalyst.

According to at least one example embodiment, the SCR catalyst is arranged downstream of the emission reducing module. The SCR catalyst is configured to convert nitrogen oxides, NOx, with the aid of a catalyst into diatomic nitrogen, N, and water and/or carbon dioxide, CO2. During use, the injected reductant (or the resulting ammonia) is reacted onto the catalyst.

According to at least one example embodiment, the exhaust aftertreatment unit comprises a controller configured to control the introduction of reductant into the fluid pathway of the exhaust gases as a function of various exhaust gas parameters, such as NOx, temperature and pressure, for the purpose of controlling NOx concentration in exhaust gases. The exhaust gas parameters may be measured by various sensors at various locations in the exhaust aftertreatment unit. For example, NOx sensors may be located at, or proximate, the inlet and outlet of the exhaust aftertreatment unit. Temperature sensors, and/or pressure sensors, may be located before and after the electrical heating element, or the SCR catalyst.

It should be understood that the electrical heating element is a heating element which is configured to be heated by means of electricity. According to at least one example embodiment, the electrical heating element comprises a coil, or a plate, configured to be heated by electricity led through the coil, or plate. Thus, the electrical heating element may be arranged such that, during use, the exhaust gases are heated by passing circumferentially through the coil, or by passing across the coil or plate. The electrical heating element may be of another shape, e.g. in the shape of a flat or curved heating lamella, or comprise a heating element of a different type, e.g. a resistance foam. According to at least one example embodiment, the electrical heating element is a Positive Temperature Coefficient, PTC, based element. According to at least one example embodiment, the electrical heating element is based on induction heating and may be referred to as an induction heating element.

Thus, during use, exhaust gases are flowing through the exhaust aftertreatment unit and guided to pass the electrical heating element whereby the exhaust gases are heated by the electrical heating element. The electrical heating element typically comprises a heating surface arranged in the fluid pathway of the exhaust aftertreatment unit such that, in use, the exhaust gases in the fluid pathway flows over or across the heating surface.

According to at least one example embodiment, the operating power of the electrical heating element is between 300 W and 15000 W, or between 1000 W and 15000 W. According to at least one example embodiment, the operating voltage of the electrical heating element is 12V, 24V or 48V.

For example, the electrical heating element is configured to keep the temperature of the exhaust gases flowing in the fluid pathway downstream of the electrical heating element at between 180° C. and 300° C. Additionality, or alternatively, the electrical heating element is configured to keep the temperature in the SCR catalyst between 180° C. and 300° C.

According to at least one example embodiment, the electrical heating element is controlled to initiate heating of the exhaust gases in response to a measured temperature upstream or downstream of the electrical heating element (and e.g. upstream or downstream of the emission reducing module and/or any secondary catalyst present), of below 180° C. According to at least one example embodiment, the electrical heating element is controlled to initiate heating of the exhaust gases in response to a measured temperature of the emission reducing module and/or any secondary catalyst being below 200° C., or below 180° C.

According to a second aspect of the invention, a method for handling an exhaust aftertreatment unit for a vehicle is provided. The exhaust aftertreatment unit comprises an emission reducing module being a DPF and/or a DOC, a selective catalyst reduction, SCR, catalyst, an electrical heating element arranged upstream of the emission reducing module, a casing housing at least the emission reducing module and the electrical heating element, and a service lid removably arranged to cover a service opening of the casing through which the emission reducing module may be accessed. The method comprises:

removing the service lid,
removing the emission reducing module for accessing the electrical heating element,
removing the electrical heating element relative the casing.

Hereby, the electrical heating element is made easily accessible and may be removed from the casing for maintenance and/or exchange. According to at least one example embodiment, the method comprises performing maintenance of the electrical heating element or exchanging the electrical heating element. Thus, the method may be referred to as a method for servicing the exhaust aftertreatment unit. The electrical heating element may be removably arranged relative the casing and is arranged accessible upon removal of the service lid, through the service opening. As described with reference to the first aspect of the invention, the casing may be arranged to house the electrical heating element and the emission reducing module in a mounting socket. Thus, the step of removing the emission reducing module for accessing the electrical heating element, may comprise removing the emission reducing module relative the casing by removing the emission reducing module from the mounting socket. Correspondingly, the step of removing the electrical heating element relative the casing, may comprise removing the electrical heating element from the mounting socket. It should be understood that the term "removing . . . relative the casing", thus refers to removing the component from a position inside the casing to a position outside the casing, e.g. by detaching the component from the mounting socket.

According to at least one example embodiment, the exhaust aftertreatment unit being subject to the method of the second aspect of invention is the same exhaust aftertreatment unit described in the first aspect of the invention. Thus, effects and features of the exhaust aftertreatment unit in the second aspect of the invention are largely analogous to those described above in connection with the first aspect of the invention. Embodiments mentioned in relation to the first aspect of the invention are largely compatible with the exhaust aftertreatment unit in the second aspect of the invention.

According to at least one example embodiment, the electrical heating element is removed relative the casing by being passed through the service opening.

According to at least one example embodiment, the electrical heating element is attached to the emission reducing module, and the step of removing the emission reducing module and the step of removing the electrical heating element is carried out simultaneously.

Hereby, a simple yet effective way of removing the electrical heating element relative the casing is provided. Thus, the emission reducing module is removably arranged relative the casing together with the electrical heating element, and the electrical heating element may be removed relative the casing upon the removal of the emission reducing module.

According to at least one example embodiment, the emission reducing module and the electrical heating element are attached to the service lid, and the step of removing the service lid and the steps of removing the emission reducing module and the electrical heating element are carried out simultaneously.

Hereby, a simple yet effective way of removing the electrical heating element relative the casing is provided. Thus, the service lid is removably arranged relative the casing together with the electrical heating element (and the emission reducing module), and the electrical heating element may be removed relative the casing upon the removal of the service lid.

According to at least one example embodiment, wherein the exhaust aftertreatment unit further comprises a secondary catalyst arranged between the emission reducing module and the electrical heating element, wherein the electrical heating element is attached to the secondary catalyst, the method further comprises:

removing the secondary catalyst relative the casing simultaneously with the step of removing the electrical heating element.

Hereby, a simple yet effective way of removing the electrical heating element relative the casing is provided. Thus, the secondary catalyst is removably arranged relative the casing together with the electrical heating element, and the electrical heating element may be removed relative the casing upon the removal of the secondary catalyst. That is, the secondary catalyst is arranged to be removable through the service opening of the casing upon removal of the service lid and the emission reducing module. Thus, the secondary catalyst may be subject to maintenance or be exchanged. Embodiments of the secondary catalyst was described with reference to the first aspect of the invention and is not repeated again.

According to at least one example embodiment, the electrical heating element is configured to be powered via at least one electrical connection as described with reference to the first aspect of the invention. Thus, the electrical connection extends from an external surface of the casing and into the mounting socket upstream of the electrical heating element. Furthermore, the exhaust aftertreatment unit may further comprise at least one guide element for guiding the electrical connection through the external surface of the casing, wherein the electrical heating element and the at least one electrical connection is removably attached to the guide element, or that the electrical heating element, the at least one electrical connection and the guide element is removably attached to the external surface of the casing.

Thus, the method may comprise the step of detaching the electrical heating element relative the casing (or mounting socket) by removing the electrical heating element and the at least one electrical connection from the guide element. Thus, the electrical connection may be detached from the guide element, whereafter the electrical heating element and the electrical connection may be removed from the casing (and the mounting socket). Alternatively, the method may comprise the step of detaching the electrical heating element relative the casing (or mounting socket) by removing the electrical heating element, the at least one electrical connection, and the guide element from the external surface of the casing. Thus, the electrical connection and the guide element may be detached from the external surface of the casing, whereafter the electrical heating element, the electrical connection and the guide element may be removed from the casing (and the mounting socket).

Thus, the method may comprise detaching, or loosening, the electrical connection from the guide element, or detaching, or loosening the guide element from the external surface of the casing.

According to at least one example embodiment, the method further comprises the steps of:
  attaching the electrical heating element relative the casing, and
  attaching the service lid to the casing.

Hereby, the serviced or maintained electrical heating element may be removably attached to the casing again, or a new electrical heating element replacing the old electrical heating element may be removably attached to the casing. The step of attaching the electrical heating element relative the casing may comprise inserting the electrical heating element into the casing by passing the electrical heating element through the service opening, possibly into the mounting socket. Thus, the service lid is attached to the casing subsequently (or simultaneously in case the electrical heating element is attached to the service lid) with the step of attaching the electrical heating element relative the casing. Typically, the service lid is attached to the casing by covering the service opening.

According to a third aspect of the invention, an electrical heating element for use in an exhaust aftertreatment unit in accordance with the first aspect of the invention is provided.

Effects and features of the third aspect of the invention are largely analogous to those described above in connection with the first aspect of the invention. Embodiments mentioned in relation to the first aspect of the invention are largely compatible with the third aspect of the invention.

Thus, the exhaust aftertreatment unit comprises an emission reducing module being a DPF and/or a DOC, a selective catalyst reduction, SCR, catalyst, an electrical heating element arranged upstream of the emission reducing module, a casing housing at least the emission reducing module and the electrical heating element, and a service lid removably arranged to cover a service opening of the casing through which the emission reducing module may be accessed. The electrical heating element is removably attachable to the exhaust aftertreatment unit and may e.g. be passed through the service opening and removably arranged inside the casing, possibly in a mounting socket. Typically, the electrical heating element is sized and dimensioned for arrangement upstream of the emission reducing module, possibly in a mounting socket.

According to a fourth aspect of the invention, use of an electrical heating element in an exhaust aftertreatment unit in accordance with the first aspect of the invention is provided.

Effects and features of the fourth aspect of the invention are largely analogous to those described above in connection with the first, second and third aspects of the invention. Embodiments mentioned in relation to the first, second and third aspects of the invention are largely compatible with the fourth aspect of the invention.

According to a fifth aspect of the invention, a vehicle comprising an exhaust aftertreatment unit in accordance with the first aspect of the invention is provided.

Effects and features of the fifth aspect of the invention are largely analogous to those described above in connection with the first aspect of the invention. Embodiments mentioned in relation to the first aspect of the invention are largely compatible with the fifth aspect of the invention.

The order of the method steps described in the second aspect of the invention is not constrained to that described in the present disclosure. One or several of the steps could switch places, or occur in a different order, unless explicitly stated so without departing from the scope of the invention. However, according to at least one example embodiment, the method steps are performed in the order described in the second aspect of the invention.

Further advantages and features of the present disclosure are disclosed and discussed in the following description and the accompanying drawings.

BRIEF DESCRIPTION OF THE DRAWINGS

With reference to the appended drawings, below follows a more detailed description of embodiments of the invention cited as examples. In the drawings.

DETAILED DESCRIPTION OF EXAMPLE EMBODIMENTS OF THE INVENTION

Figure 1:
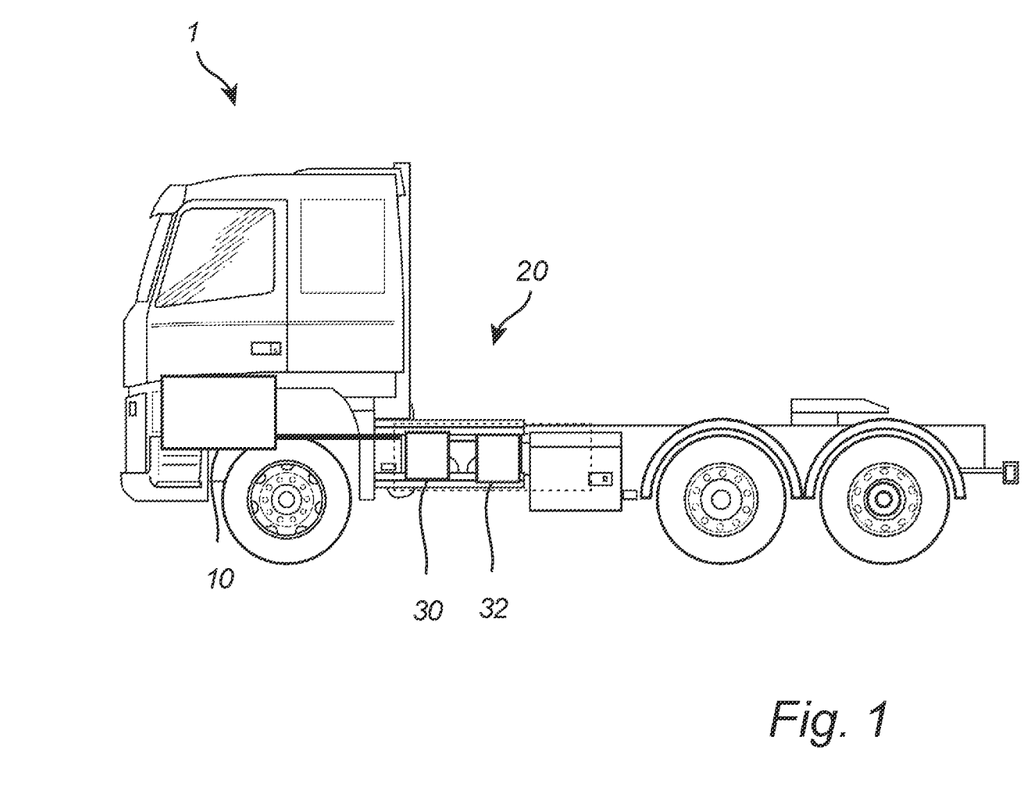
FIG. 1 is a schematic side view of a vehicle comprising an exhaust aftertreatment unit in accordance with an example embodiment of the invention.

With reference to FIG. 1 a vehicle 1, here embodied as a heavy duty truck 1 for which an exhaust aftertreatment unit 20 of a kind disclosed in the present disclosure is advantageous. However, the exhaust aftertreatment unit 20 may as well be implemented in other types of vehicles, such as in busses, light-weight trucks, passenger cars, marine applications etc. The vehicle 1 of FIG. 1 comprises an engine 10, being a diesel engine 10, but the vehicle may according to at least one example embodiment be a hybrid vehicle further comprising an electric machine (not shown). The diesel engine 10 is powered by diesel fuel, typically comprised in a fuel tank, and any electric machine is typically powered by electricity supplied from at least one energy storage or transformation device, e.g. a battery or a fuel cell.

In FIG. 1, the vehicle 1 comprises an exhaust aftertreatment unit 20 for cleaning exhaust gases from at least the diesel engine 10. The exhaust aftertreatment unit 20 comprises at least an emission reducing module 30 being a DPF and/or a DOC, and a selective catalyst reduction catalyst 32, hereafter referred to as an SCR catalyst 32 arranged downstream of the emission reducing module 30. The emission reducing module 30 is arranged and configured to remove particles, i.e. diesel particulate matter or soot, from the exhaust gas of the diesel engine 10 and/or is arranged and configured to convert carbon monoxide and hydrocarbons into carbon dioxide. The SCR catalyst 32 is arranged and configured to convert nitrogen oxides, also referred to as NOx, with the aid of a catalyst, into diatomic nitrogen, N2, and water and/or carbon dioxide CO2. A reductant, typically anhydrous ammonia, aqueous ammonia, urea, aqueous urea or a diesel exhaust fluid solution is added to the engine exhaust gases and is absorbed onto the catalyst in the SCR catalyst 32. The exhaust aftertreatment unit 20 may be comprised in an exhaust aftertreatment system of the vehicle, the exhaust aftertreatment system comprising further components such as e.g. piping and other emission reducing components.

Figure 2:
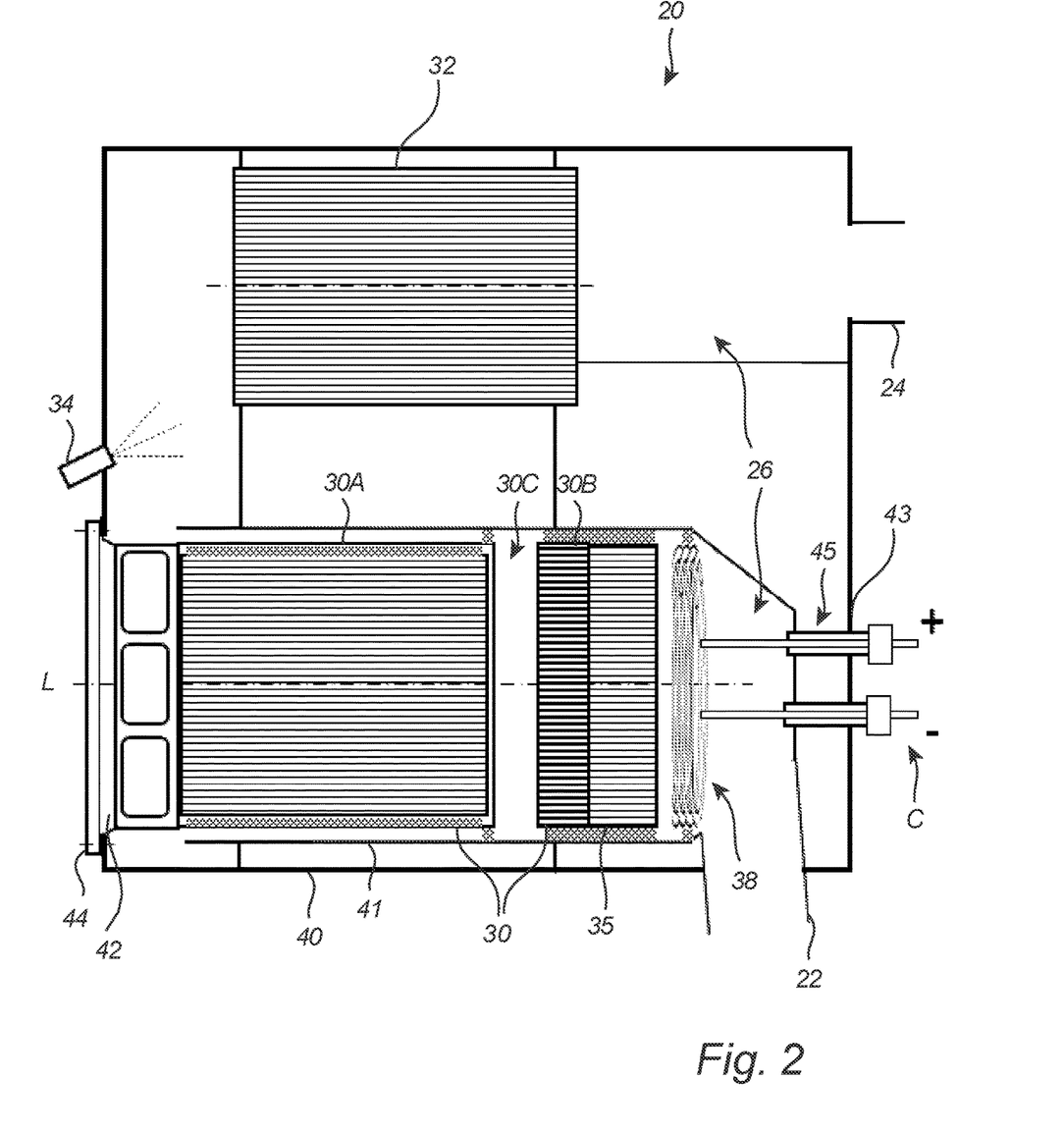
FIG. 2 is a schematic cross sectional view of an exhaust aftertreatment unit in accordance with an example embodiment of the invention.

In FIG. 2, the exhaust aftertreatment unit 20 of FIG. 1 is shown in greater detail. The exhaust aftertreatment unit 20 comprises an inlet 22 for receiving the exhaust gases, an outlet 24 for discharging at least partly cleaned exhaust gases from the exhaust aftertreatment unit 20, and a fluid pathway 26 for transporting the exhaust gases from the inlet 22 to the outlet 24. The exhaust aftertreatment unit 20 further comprises an emission reducing module 30 including a diesel particulate filter, DPF 30A and a diesel oxidation catalyst, DOC 30B, and an SCR catalyst 32, arranged downstream of the emission reducing module 30. In FIG. 2, the DPF 30A and the DOC 30B are separate units separated by a gap 30C. However, the DPF 30A may be arranged in the same unit as the DOC 30B and/or be firmly attached to each other by a connecting element bridging the gap 30C. Moreover, in order to provide ammonia to the SCR catalyst 32, the exhaust aftertreatment unit 20 comprises an injector 34 for injecting a reductant, as previously described. The reductant may e.g. be urea. The exhaust aftertreatment unit 20 further comprises secondary catalyst 35 arranged upstream of the emission reducing module 30, and which in FIG. 2 is attached to the DOC 30B. The secondary catalyst 35 may e.g. be a secondary SCR. Moreover, an electrical heating element 38 is arranged upstream of the emission reducing module 30, and in FIG. 2 also upstream of the secondary catalyst 35. Thus, the secondary catalyst 35 is arranged between the emission reducing module 30 and the electrical heating element 38. The emission reducing module 30, the SCR catalyst 32, the secondary catalyst 35 and the electrical heating element 38 are housed in a casing 40.

The exhaust aftertreatment unit 20 is typically operated in the following manner: exhaust gases (to be cleaned) from the diesel engine enter the exhaust aftertreatment unit 20 via the inlet 22, and encounters the electrical heating element 38 and is heated. Thereafter, the exhaust gases pass through the secondary catalyst 35 and the emission reducing module 30 by first passing through the DOC 30B, the gap 30C and the DPF 30A. Thus, the fact that the exhaust gases are heated improves the performance of the emission reducing module 30 and the secondary catalyst 35 prior to that the flow of exhaust gases continuous along the fluid pathway 26 to a position in which the urea is injected by injector 34. The injected reductant is thus mixed with the heated exhaust gases and the heat provided by the electrical heating element 38 may be adapted to be sufficient for evaporating and hydrolysing the urea into ammonia. The ammonia and exhaust gases thereafter enter the SCR catalyst 32 for catalytic reduction of the NOx, whereafter the cleaned exhaust gases are discharged from the exhaust aftertreatment unit 20 via the outlet 24.

Figure 3:
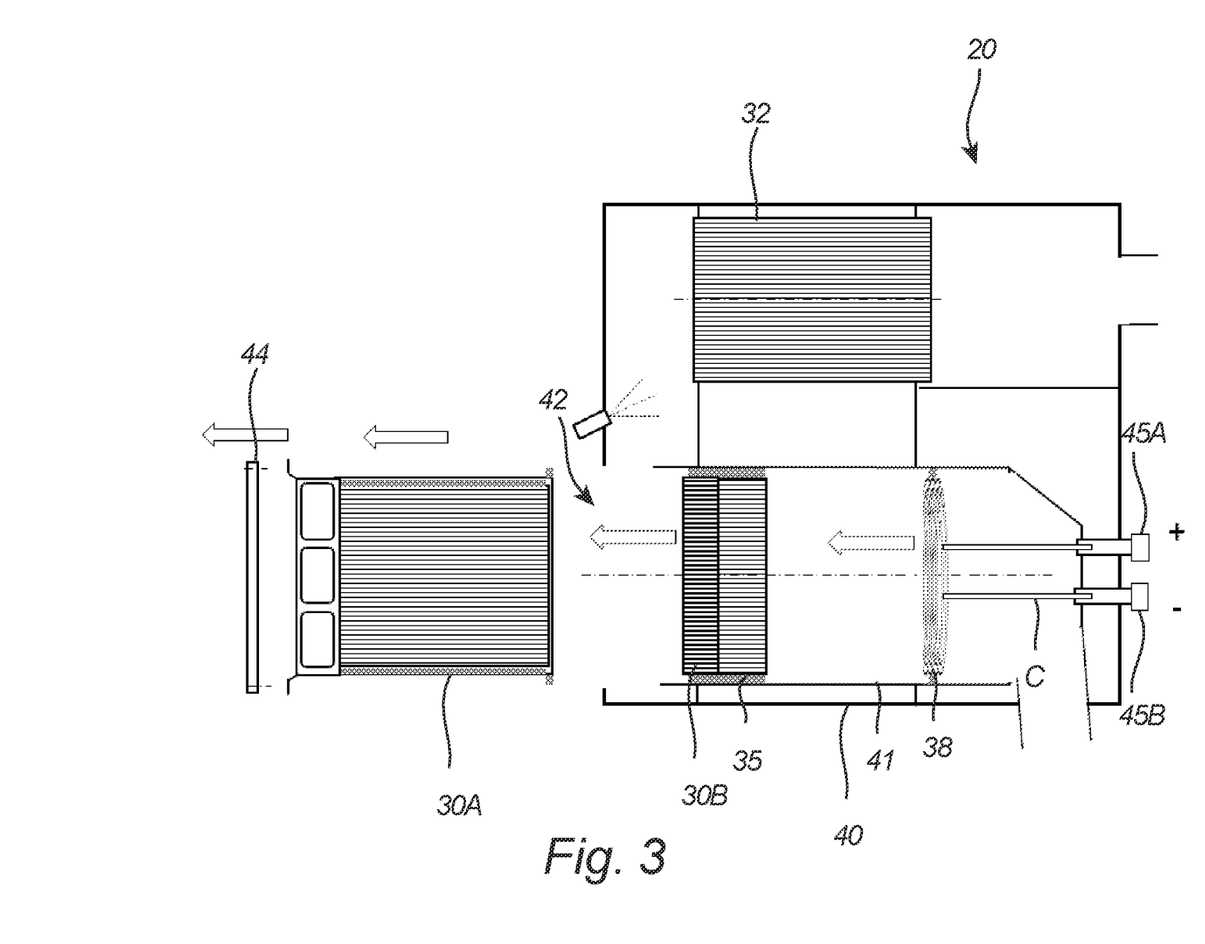
FIG. 3 shows a schematic example of how the electrical heating element is removed from the casing, applicable to example embodiments of the invention.

In FIG. 2, the casing 40 comprises a mounting socket 41 housing at least some components of the exhaust aftertreatment unit 20, here being the emission reducing module 30, the secondary catalyst 35 and the electrical heating element 38. Hereby, the components 30, 35, 38 may be satisfactorily arranged inside the casing 40. The mounting socket 41 is in FIG. 2 tubularly or cylindrically shaped and extends along a longitudinal axis L. Moreover, the electrical heating element 38 is powered by at least an electrical connection C extending from an external surface 43 of the casing 40 and into the mounting socket 41 upstream of the electrical heating element 38. The electrical connection C comprises two electrical connection wires, a power wire (or phase wire, indicated with a "+") and a neutral wire (indicated with a "−"), but will typically simply be referred to as the electrical connection C in the following. The electrical connection C extends into the mounting socket in a direction along or parallel to the longitudinal axis L, which will be further discussed later in the text. The electrical connection C extends in FIG. 2 through the casing 40 and the external surface 43 by means of a guide element 45 (typically one guide element for each electrical connection wire as seen in FIG. 3). Thus, the guide element 45 guides the electrical connection C through the casing 40 and the external surface 43.

For various reasons, accessibility of the emission reducing module 30, the secondary catalyst 35 and/or the electrical heating element 38 is desirable. Thus, the casing 40 comprises a service opening 42 through which at least the emission reducing module 30 may be passed (if removed from the casing 40). Thus, the emission reducing module 30 may be removed from the casing 40 for maintenance or exchange, and/or may be inserted into the casing 40 for installation. The service opening 42 is closable by means of a removably arranged service lid 44. In other words, the service lid 44 is removably arranged to cover the service opening 42. Thus, the service lid 44 may be considered as a separate component to the casing 40.

The electrical heating element 38 is removably arranged relative the casing 40, by being removably arranged relative the mounting socket 41, e.g. by being detachable from the mounting socket 41 and/or the casing 40. Correspondingly, the emission reducing module 30 (i.e. in FIG. 2, the DPF 30A and the DOC 30B) is removably arranged relative the casing 40, by being removably arranged relative the mounting socket 41, e.g. by being detachable from the mounting socket 41 and/or the casing 40. Moreover, typically the secondary catalyst 35 is removably arranged relative the casing 40, by being removably arranged relative the mounting socket 41, e.g. by being detachable from the mounting socket 41 and/or the casing 40. Thus, the electrical heating element 38 is arranged inside the casing 40, and inside the mounting socket 41, in such a way that it is accessible through the service opening 42 upon removal of the service lid 44, the emission reducing module 30, and the secondary catalyst 35. Thus, the electrical heating element 38 may be removed from the casing 40 and the mounting socket 41 and exchanged and/or be subject to maintenance.

A procedure of handling the exhaust aftertreatment unit 20 of FIG. 2, will now briefly be described with reference to FIG. 3. The method may be referred to as a method for accessing the electrical heating element 38 in the casing 40 and/or mounting socket 41. First, as shown in FIG. 3, the service lid 44 is removed from the casing 40. Subsequently, the emission reducing module 30 is removed from the casing 40 and the mounting socket 41 by first removing the DPF 30A, and then removing the DOC 30B. As the DOC 30B is attached to the secondary catalyst 35 in the embodiment of FIG. 3, the secondary catalyst 35 is removed from the casing 40 and the mounting socket 41 together with emission reducing module 30 and the DOC 30B. Hereby, the emission reducing module 30 and the secondary catalyst 35 are made accessible for e.g. maintenance or exchange. However, it should be noted that the secondary catalyst 35 is optional and may be omitted from the exhaust aftertreatment unit 20, Moreover, the DOC 30B or the DPF 30A may be omitted from the exhaust aftertreatment unit 20. Thus, the emission reducing module 30 may simply be a DPF or a DOC.

Once the emission reducing module 30 and the secondary catalyst 35 have been removed from the casing, the electrical heating element 38 is accessible via the service opening 42. In the embodiment of FIG. 3, the electrical heating element 38 is attached to the electrical connection C, and is thus removably arranged relative the casing 40 together with the electrical connection C. In more detail, the guide element 45 comprises a first guide element 45A for guiding a first of the two electrical connection wires, and a second guide element 45B for guiding the other of the two electrical connection wires. The electrical heating element 38 and the electrical connection C with its two electrical connection wires are removably attached to the first and second guide elements 45A, 45B. Thus, subsequently to removing the emission reducing module 30 and the secondary catalyst 35, the electrical heating element 38 may be removed relative the casing 40 and the mounting socket 41 via the service opening 42, by detaching the electrical connection C from the guide element 45A, 45B. Hereby, the electrical heating element 38 is made accessible for e.g. maintenance or exchange. As shown in FIG. 3, as the electrical connection C extends inside the mounting socket 41 in a direction along or parallel to the longitudinal axis L (or rather, that the first and second electrical connection wires extends in a direction along or parallel to the longitudinal axis L), the electrical heating element 38 can be axially removed by passing the electrical heating element out of the casing 40 and the mounting socket 41 in a direction along or parallel to the longitudinal axis L such that the electrical connection C can be passed through the first and second guide elements 45A, 45B. Thus, the electrical connection C is avoided from interacting, and potentially getting stuck with, an internal surface of the mounting socket 41 during removal of the electrical heating element 38.

Figure 4A:
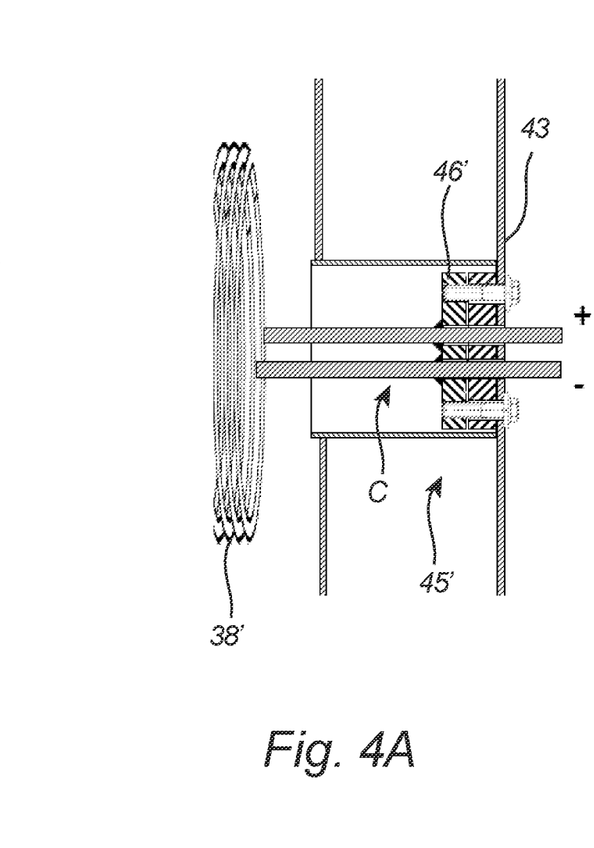
FIGS. 4A-4B shows a schematic example of how the electrical heating element is attached to the casing via the electrical connection, and how the electrical heating element can be removed from the casing, applicable to example embodiments of the invention.
Figure 4B:
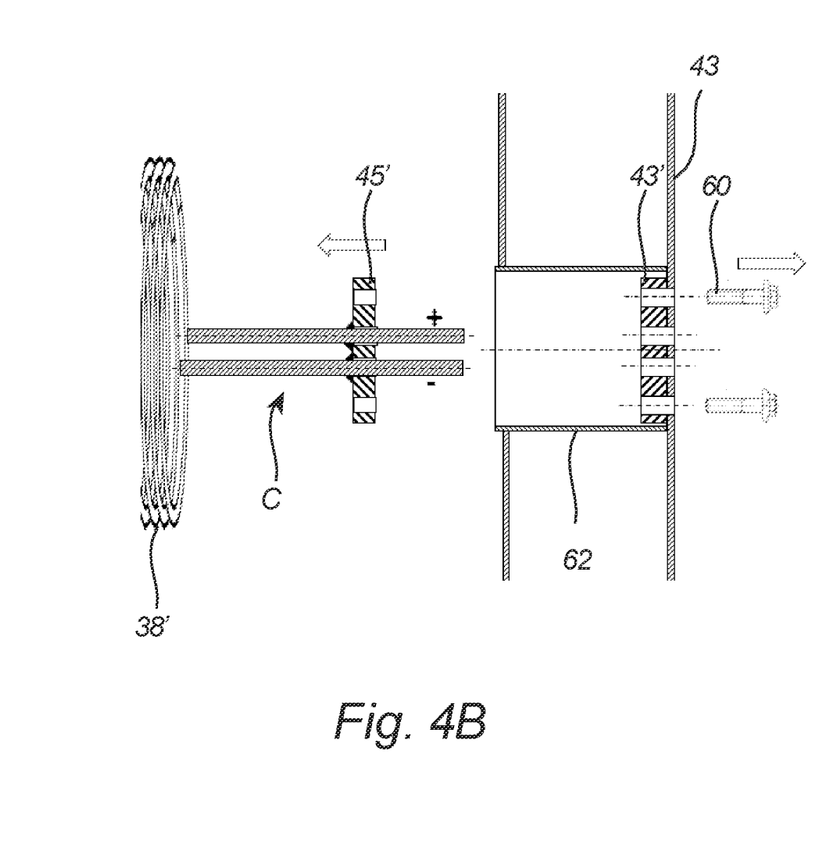

In another embodiment shown in FIGS. 4A-4B, the electrical heating element 38', the at least one electrical connection C and the guide element 45' are removably attached to the external surface 43 of the casing. Here, the guide element 45' comprises at least one flange 46', the flange 46' being firmly attached to the electrical connection C of the electrical heating element 38'. Moreover, the flange 46' is configured to be attached to an attachment portion 43' of the external surface 43 by means of screws 60. Thus, the flange 46' comprise a plurality of threaded holes and is releasably mounted in the external surface 43 to the attachment portion 43' by means of that the screws is threadedly engageable with the threaded holes. Thus, the electrical heating element 38 may be removed from the casing and the external surface 43 together with the guide element 45' and the electrical connection C by unthreading the screws and thereby releasing the flange 46' from the attachment portion 43', as seen in FIG. 4B. Thus, the electrical heating element 38' can be axially removed by passing the electrical heating element 38' out of the casing 40 and the mounting socket 41 in a direction along or parallel to the longitudinal axis L, as described with reference to FIG. 3.

Figure 5A:
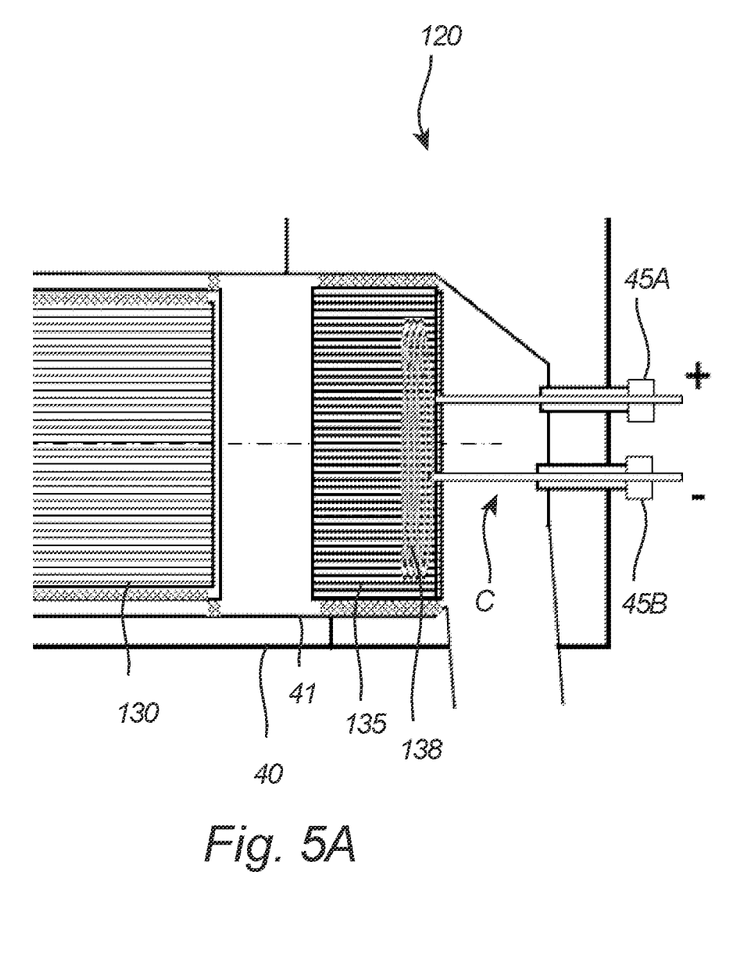
FIGS. 5A-5B show schematic cross sectional views of different example embodiments of the exhaust aftertreatment unit of the invention.

In FIG. 5A, an alternative embodiment of the exhaust aftertreatment unit 120 is shown. The exhaust aftertreatment unit 120 is very similar to the exhaust aftertreatment unit 20 of FIGS. 2-3, why the same reference numerals are used to denote the same or corresponding components, and only the differences between the embodiments are described in detail (and only the part of the exhaust aftertreatment unit 120 being subject to the differences are shown in FIG. 5A). In the embodiment of FIG. 5A, the exhaust aftertreatment unit 120 comprises an emission reducing module 130 and a secondary catalyst 135. The emission reducing module 130 is a DPF and/or a DOC, and is separated from the secondary catalyst 135 inside the mounting socket 41 of the casing 40. Moreover, in FIG. 5A, the electrical heating element 138 is attached to, or is integrated into the secondary catalyst 135. Hereby, the electrical heating element 138 may be removed from the casing 40 and the mounting socket 41 together with the secondary catalyst 135. Thus, the secondary catalyst 135, the electrical heating element 138 and the electrical connection C may be detached from the first and second guide elements 45A, 45B, and axially removed by passing the components out of the casing 40 and the mounting socket 41 in a direction along or parallel to the longitudinal axis L.

Figure 5B:
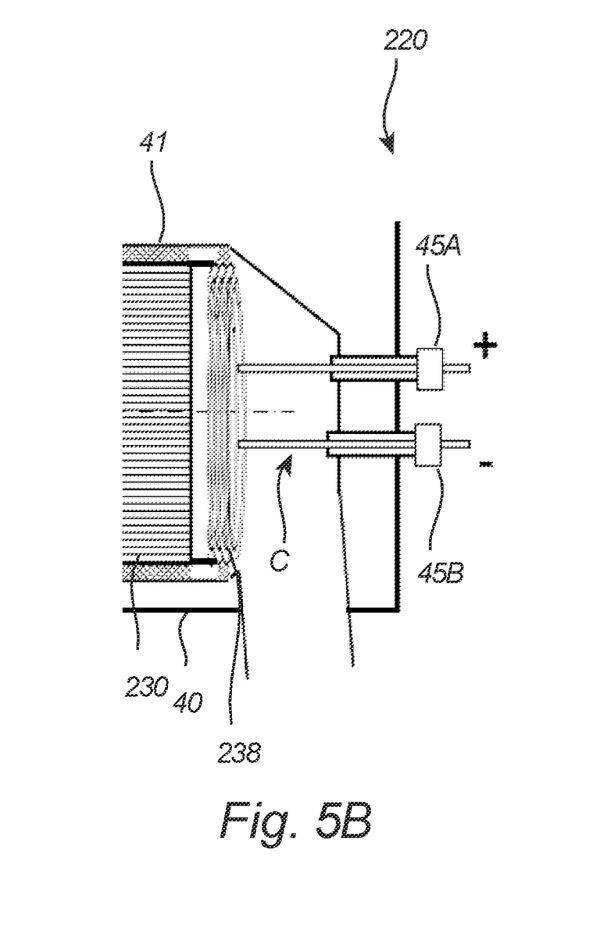

In FIG. 5B, yet another alternative embodiment of the exhaust aftertreatment unit 220 is shown. The exhaust aftertreatment unit 220 is very similar to the exhaust aftertreatment unit 20 of FIGS. 2-3, why the same reference numerals are used to denote the same or corresponding components, and only the differences between the embodiments are described in detail (and only the part of the exhaust aftertreatment unit 220 being subject to the differences are shown in FIG. 5B). In the embodiment of FIG. 5B, the exhaust aftertreatment unit 120 comprises an emission reducing module 230 (and no secondary catalyst arranged upstream of the emission reducing module 230 in the mounting socket 41). The emission reducing module 230 is a DPF and/or a DOC, and is arranged inside the mounting socket 41 of the casing 40. Moreover, in FIG. 5B, the electrical heating element 238 is attached to the emission reducing module 230. Hereby, the electrical heating element 238 may be removed from the casing 40 and the mounting socket 41 together with the emission reducing module 230. Thus, the emission reducing module 230, the electrical heating element 238 and the electrical connection C may be detached from the first and second guide elements 45A, 45B, and axially removed by passing the components out of the casing 40 and the mounting socket 41 in a direction along or parallel to the longitudinal axis L.

It should be noted that the secondary catalyst 35, 135 and the emission reducing module 30, 130, 230 are structurally and functionally separated from each other, as well as structurally and functionally separated from the guide element 45, 45A, 45B, 45'. Thus, the exhaust aftertreatment unit 20, 120, 220 may optionally be equipment with or without the secondary catalyst 35, 135, and/or with or without the guide element 45, 45A, 45B, 45'. Moreover, the DPF 30A and the DOC 30B are structurally and functionally separated from each other, and may be combined as a DPF/DOC in the emission reducing module 130, 230 of FIGS. 5A-5B, or may be comprised in the emission reducing module 30 of FIG. 2 without the inclusion of the other.

Figure 6:
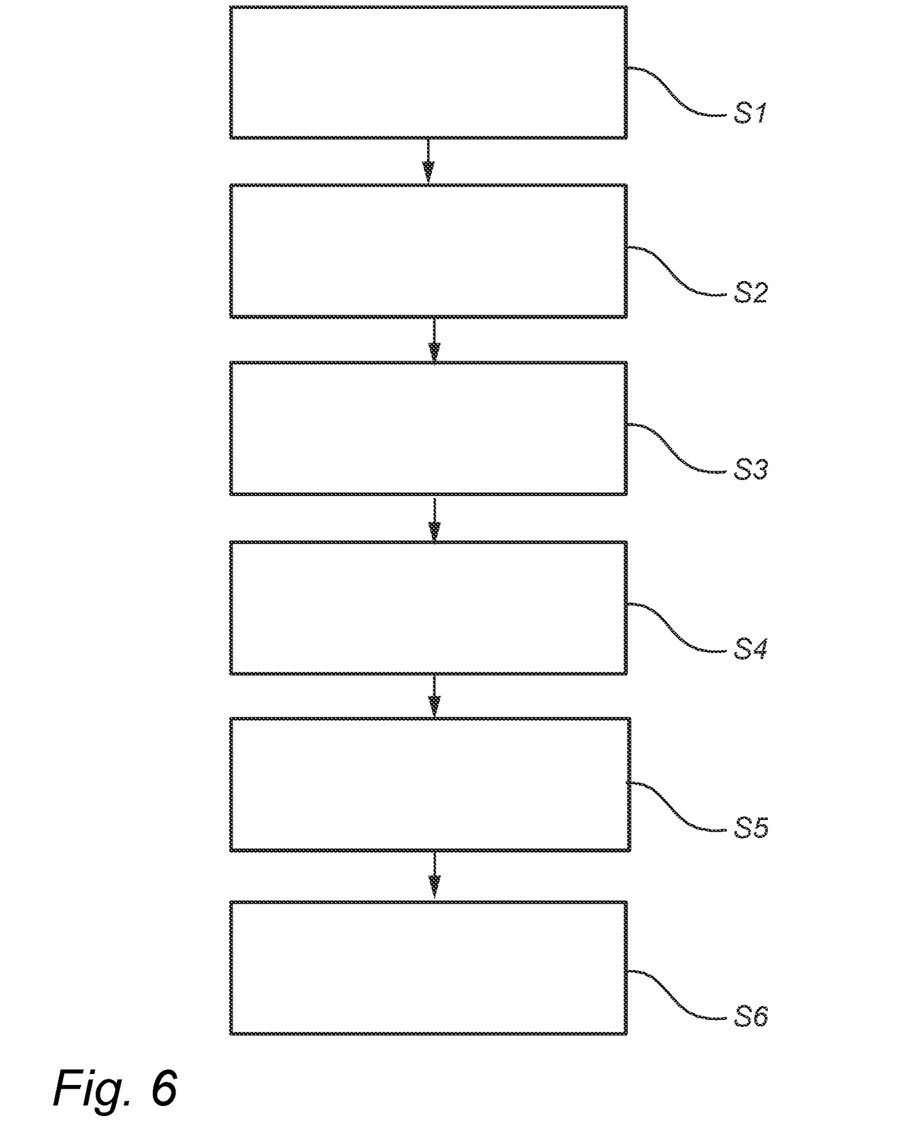
FIG. 6 is a flowchart illustrating the steps of a method in accordance with one example embodiment of the invention.

Turning to the flowchart of FIG. 6, schematically illustrating steps of a method for handling, or servicing, an exhaust aftertreatment unit for a vehicle, such as the exhaust aftertreatment unit 20 of FIGS. 2-3, possibly with the configuration of the electrical heating element 38' of FIGS. 4A-4B, and the exhaust aftertreatment unit 120 of FIG. 5A and exhaust aftertreatment unit 220 of FIG. 5B. Thus, the exhaust aftertreatment unit comprises an emission reducing module being a DPF and/or a DOC, a selective catalyst reduction, SCR, catalyst, an electrical heating element arranged upstream of the emission reducing module, a casing housing at least the emission reducing module and the electrical heating element, and a service lid removably arranged to cover a service opening of the casing through which the emission reducing module may be accessed.

In a step S1, the service lid is removed. Hereby at least the emission reducing module may be accessed for maintenance and/or exchange.

In a step S2, the emission reducing module is removed for accessing the electrical heating element. The emission reducing module is removed relative the casing and may thus be subject to maintenance or exchange.

In a step S4, the electrical heating element is removed relative the casing. Hereby, the electrical heating element may be subject to maintenance or exchange.

Typically, as the electrical heating element and the emission reducing module are arranged in the mounting socket, the step of removing the emission reducing module S2 comprises removing the emission reducing module from the mounting socket and the step of removing the electrical heating element S4 comprises removing the electrical heating element from the mounting socket.

Moreover, as described with reference to the exhaust aftertreatment unit 20, 120 of FIGS. 2 and 5A, the exhaust aftertreatment unit may comprise a secondary catalyst arranged between the emission reducing module and the electrical heating element. Thus, in an optional step S3, the secondary catalyst is removed relative the casing.

The electrical heating element may according to one example embodiment be attached to the emission reducing module. Thus, the step of removing the emission reducing module S2 and the step of removing the electrical heating element S4 may be carried out simultaneously. Additionally, or alternatively, the electrical heating element is attached to the secondary catalyst. Thus, the step of removing the secondary catalyst S3 relative the casing and the step of removing the electrical heating element S4 may be carried out simultaneously. According to at least one example embodiment, the electrical heating element is attached to the emission reducing module and the secondary catalyst, and the step of removing the emission reducing module S2, the step of removing the electrical heating element S4 and the step of removing the secondary catalyst S3 are carried out simultaneously.

Thus, the step S1 may e.g. be a first step S1 as shown in FIG. 3, in which the service lid is removed prior to the step of removing the emission reducing module S2, the latter thus being a second step S2. Alternatively, the step S1 and the step S2 are carried out simultaneously, in which the service lid is removed together with the emission reducing module. Moreover, the step S3 may be a third step, or a subsequent step to step S2, as the secondary catalyst is removed relative the casing subsequent to the second step S2 or subsequent to the combined steps S1, S2. Furthermore, the step S4 may be a fourth step, or a subsequent step to the step S2 or S3, as the electrical heating element is removed relative the casing subsequent to the second step S2 or third step S3. As yet an alternative, in which no secondary catalyst is present in the casing upstream of the emission reducing module, the service lid is attached to the electrical heating element via the emission reducing module, and the step of removing the service lid S1, the step of removing the emission reducing module S2, and the step of removing the electrical heating element S4 are carried out simultaneously.

In an optional step S5, the electrical heating element is attached, or is re-attached, relative the casing. Such optional step S5 is thus performed subsequent to at least the step of removing the electrical heating element S4. For example, the electrical heating element may be inserted into the casing and the mounting socket.

In an optional step S6, the service lid is attached to the casing. The optional step S5 may be performed simultaneously with the optional step S6 if the electrical heating element is attached to the service lid, e.g. via the emission reducing module It is to be understood that the present invention is not limited to the embodiments described above and illustrated in the drawings; rather, the skilled person will recognize that many changes and modifications may be made within the scope of the appended claims. For example, the exhaust aftertreatment unit may be used for cleaning exhaust gases of other engines than diesel engines. For example, the present exhaust aftertreatment unit may be used to clean exhaust gases, e.g. by converting NOx emissions, from the exhaust of internal combustion engines based on CNG (Compressed Natural Gas), LPG (Liquified Pressurized Gas), DME (DiMethylEther), and/or H2 (Hydrogen).

Additionally, variations to the disclosed embodiments can be understood and effected by the skilled person in practicing the claimed inventive concept, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. An exhaust aftertreatment unit for cleaning exhaust gases, the exhaust aftertreatment unit comprising:
an emission reducing module being a diesel particulate filter ("DPF") and/or a diesel oxidation catalyst, DOC,
a selective catalyst reduction ("SCR") catalyst,
an electrical heating element arranged upstream of the emission reducing module,
a casing housing at least the emission reducing module and the electrical heating element, and a service lid removably arranged to cover a service opening of the casing through which the emission reducing module may be accessed and passed through upon removal of the service lid, wherein the electrical heating element is arranged on an opposite side of the emission reducing module compared to the service lid, is removably arranged relative the casing and is arranged accessible upon removal of the service lid and the emission reducing module.

2. The exhaust aftertreatment unit according to claim 1, wherein the casing comprises a mounting socket housing the emission reducing module and the electrical heating element.

3. The exhaust aftertreatment unit according to claim 2, wherein the electrical heating element is powered by at least one electrical connection extending from an external surface of the casing and into the mounting socket upstream of the electrical heating element.

4. The exhaust aftertreatment unit according to claim 3, further comprising at least one guide element for guiding the electrical connection through the external surface of the casing, wherein the electrical heating element and the at least one electrical connection are removably attached to the guide element, or that the electrical heating element, the at least one electrical connection and the guide element are removably attached to the external surface of the casing.

5. The exhaust aftertreatment unit according to claim 3, wherein the mounting socket extends along a longitudinal axis, and wherein the at least one electrical connection extends inside the mounting socket in a direction along or parallel to the longitudinal axis.

6. The exhaust aftertreatment unit according to claim 2, wherein the emission reducing module and the electrical heating element are removably arranged relative the mounting socket.

7. The exhaust aftertreatment unit according to claim 1, wherein the electrical heating element is attached to the emission reducing module and is removably arranged relative the casing together with the emission reducing module.

8. The exhaust aftertreatment unit according to claim 1, further comprising a secondary catalyst arranged between the emission reducing module and the electrical heating element.

9. The exhaust aftertreatment unit according to claim 1, further comprising an injector configured to inject a reductant for providing ammonia to the SCR catalyst, wherein the injector is arranged upstream of the SCR catalyst and downstream of the emission reducing module.

10. A vehicle comprising an exhaust aftertreatment unit according to claim 1.

* * * * *